UNITED STATES PATENT OFFICE 2,253,124

PROCESS FOR THE MANUFACTURE OF PREPARATIONS INFLUENCING THE BLOOD PRESSURE

Max Hartmann, Riehen, and Emil Schlittler, Basel, Switzerland, assignors, by mesne assignments, to Ciba Pharmaceutical Products, Incorporated, Summit, N. J., a corporation of New Jersey No Drawing. Application October 11, 1938, Serial No. 234,494. In Switzerland October 23, 1937

3 Claims. (Cl. 167—74)

It is known that the non-dialysable substances contained in urine which depress the blood pressure consist of two components, namely a thermolabile component and a thermostable component (Elliot and Nuzum, Endocrinology, vol. 18, page 462 et seq., 1934).

The thermolabile substance can be obtained by precipitating by means of uranyl acetate the urine freed from phosphate eluting the precipitate and subsequently purifying the liquid with the aid of adsorption agents. The only methods which have hitherto been recommended for the preparation of the thermostable substance consist in salting out with ammonium sulphate or precipitation with methyl alcohol (Wollheim, Acta Medica Scandinavica, 1936, page 10). However, it has not hitherto been possible to prepare the substances influencing the blood pressure which contain the thermostable component in particularly high concentration.

According to this invention preparations of the non-dialysable substances which influence the blood pressure and contain the thermostable component in particularly high concentration are obtained by precipitating the urine, freed from phosphate, by means of a salt, soluble in water, of a heavy metal of the first, second and fourth group of the periodic classification and then eluting the precipitate with a weak buffer solution.

For the precipitation there is preferably used a salt, soluble in water, of copper or of lead, for example copper acetate, lead acetate, copper propionate or mercuric chloride. As buffer solution there may be used, for example, a solution of a phosphate such as diammonium phosphate or dialkali phosphate or other weak buffer solutions as for instance alkali borates having a pH value of about 6–9.

Pharmacological tests of the products obtained in accordance with the invention show that in comparison with the hitherto known substances which reduce the blood pressure they have an appreciably stronger and more protracted action. They are useful for therapeutic application.

The following examples illustrate the invention:

Example 1

100 litres of human urine preserved with phenol are freed from phosphates by means of magnesia mixture and there are added first 10 litres of alcohol and then a solution of 350 grams of crystallized copper sulphate and 190 grams of crystallized sodium acetate in 4 litres of water. The precipitate is separated by centrifuging, washed with water on the filter and then for elution shaken for 1 hour with 2 litres of a diammonium phosphate solution of 10 per cent strength. The precipitate is separated and again shaken with 2 litres of diammonium phosphate solution of 1 per cent strength. From the aqueous solution the phosphate is precipitated by magnesia mixture and the solution freed from phosphate is further purified by dialysis. There is thus obtained an extract which contains 20–30 milligrams of dry substance per litre of parent material.

Example 2

To 10 litres of cattle urine there is added a solution of 600 grams of lead acetate in water and the formed precipitate is immediately centrifuged. For elution the precipitate is shaken for one hour with a diammonium phosphate solution of 10 per cent strength. Liquid and solid phase are again separated by centrifuging and the solid material is reextracted with one liter of diammonium phosphate solution of 1 per cent strength. The two extracts are united and the phosphate is precipitated by magnesia mixture. The solution may further be purified by dialysis. There is thus obtained an extract containing 200 to 300 milligrams of dry substance per liter of parent material.

Instead of lead acetate there may be used other heavy metal salts of the first, second and fourth group of the periodic classification, such as for instance zinc, cadmium, or also tin salts.

Preparations obtainable as above disclosed will contain the thermo-stable component of the non-dialysable substances in such a high concentration that even as little as 6 gammas (0.000006 gr.) per kilo body weight will cause a depression of the blood pressure of a rabbit for at least ten minutes.

What we claim is:

1. A process for the manufacture of preparations of non-dialysable substances capable of depressing the blood pressure and containing a thermo-stable component in particularly high concentration, comprising precipitating urine freed from phosphate by means of a water-soluble salt of a heavy metal which is a member of the group consisting of the metals of the first, second and fourth group of the periodic classification, and then eluting the precipitate with a buffer solution having a pH of about 6–9.

2. A process for the manufacture of preparations of non-dialysable substances capable of depressing the blood pressure and containing a thermo-stable component in particularly high concentration, comprising precipitating urine freed from phosphate by means of a water soluble copper salt, and then eluting the precipitate with a buffer solution having a pH of about 6–9.

3. A process according to claim 2 wherein copper acetate is used for the precipitation step.

MAX HARTMANN.
EMIL SCHLITTLER.